United States Patent
Gonzales et al.

(10) Patent No.: US 8,030,894 B2
(45) Date of Patent: Oct. 4, 2011

(54) SYSTEM AND METHOD FOR REBALANCING A VEHICLE BATTERY

(75) Inventors: Philip Michael Gonzales, Dearborn, MI (US); Tuyen Quoc Tran, Dearborn, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/849,281

(22) Filed: Aug. 3, 2010

(65) Prior Publication Data

US 2011/0163720 A1    Jul. 7, 2011

(51) Int. Cl.
*H02J 7/00* (2006.01)
*B60K 1/00* (2006.01)
*H02G 3/00* (2006.01)
*B65G 1/00* (2006.01)

(52) U.S. Cl. ...... 320/116; 320/109; 180/65.1; 307/10.1; 414/281

(58) Field of Classification Search .................... 320/116
See application file for complete search history.

(56) References Cited

U.S. PATENT DOCUMENTS

| | | | |
|---|---|---|---|
| 4,983,904 A | 1/1991 | Iwahashi | |
| 5,828,201 A | 10/1998 | Hoffman, Jr. et al. | |
| 5,869,950 A | 2/1999 | Hoffman, Jr. et al. | |
| 6,114,835 A | 9/2000 | Price | |
| 6,275,004 B1 | 8/2001 | Tamal et al. | |
| 6,614,204 B2 * | 9/2003 | Pellegrino et al. | 320/109 |
| 6,686,724 B2 | 2/2004 | Coates et al. | |
| 7,565,942 B2 * | 7/2009 | Shibata et al. | 180/243 |
| 2002/0070706 A1 | 6/2002 | Champlin | |
| 2003/0120442 A1 * | 6/2003 | Pellegrino et al. | 702/60 |
| 2007/0029971 A1 * | 2/2007 | Anderson et al. | 320/132 |
| 2009/0164152 A1 * | 6/2009 | Creus et al. | 702/63 |

* cited by examiner

Primary Examiner — Edward Tso
Assistant Examiner — Yalkew Fantu
(74) Attorney, Agent, or Firm — David B. Kelley; Brooks Kushman P.C.

(57) ABSTRACT

A vehicle may include an electric machine, a battery, a driver interface and one or more controllers. The one or more controllers may be configured to determine whether a battery imbalance condition exists, to cause an alert to be generated via the driver interface if a battery imbalance condition exists, to determine whether a response to the alert is received, and to cause the battery to be rebalanced in a single cycle if a response to the alert is received.

18 Claims, 2 Drawing Sheets

SYSTEM AND METHOD FOR REBALANCING A VEHICLE BATTERY

BACKGROUND

Battery electric vehicles (BEVs) may be caused to move by operation of an electric machine. Plug-in hybrid electric vehicles (PHEVs) may be caused to move by operation of an electric machine and/or an internal combustion engine. The electric machine, in either case, may receive electrical power from an on-board battery. The battery may include a plurality of cells electrically connected in series and be charged with electrical power from a utility grid or other source, etc.

For efficiency and battery durability reasons, it may be desirable to keep the states of charge/energy contents of the battery cells approximately equal. Providing energy to or removing energy from the battery, however, may cause the states of charge/energy contents of the battery cells to become unequal.

SUMMARY

A vehicle may include an electric machine configured to generate motive power for the vehicle, a battery configured to store energy for the electric machine, and one or more controllers. The one or more controllers may be configured to determine whether to rebalance the battery in a single cycle or in a plurality of cycles and to cause the battery to be rebalanced in accordance with the determination.

DETAILED DESCRIPTION

Figure 1:
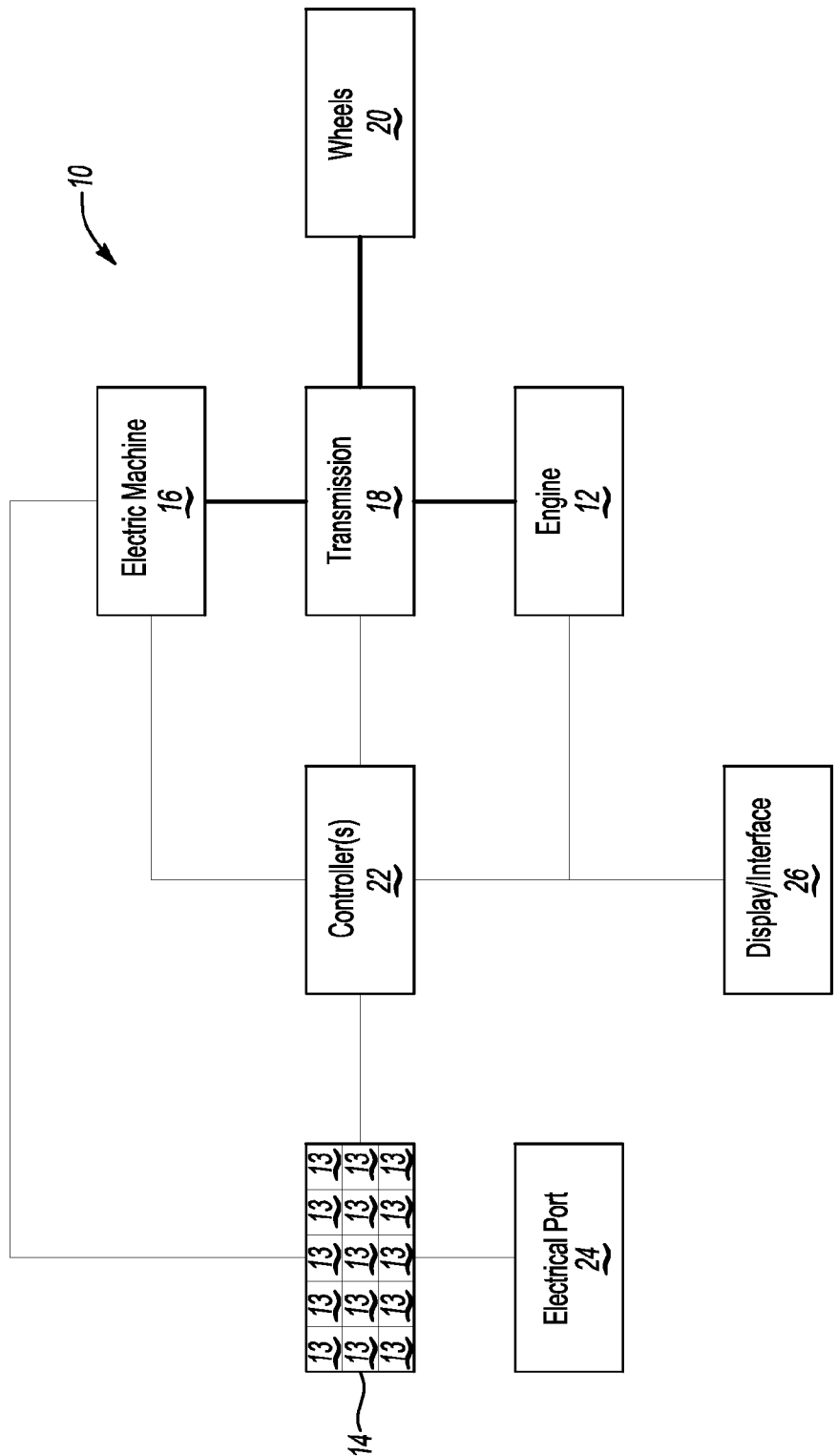
FIG. 1 is a block diagram of an example PHEV.

Battery rebalancing may be performed to correct state of charge/energy content imbalances among cells of a BEV or PHEV battery. The cells having a state of charge greater than the cell having the lowest state of charge, for example, will be bled down. All cells may then be charged with energy from an off-board energy source (e.g., utility grid, etc.)

BEV/PHEV battery rebalancing is typically performed incrementally and while the vehicle is on-plug (plugged in). A battery, for example, may include 30 cells. Assuming that twenty nine of the cells have a 70% state of charge and one of the cells has a 60% state of charge, the states of charge of the twenty nine cells will be bled down to 68%, for example, and then all of the cells will be charged so as to raise each of the cells state of charge by 2%. After this first cycle, the twenty nine cells will have a 70% state of charge and the one cell will have a 62% state of charge. The states of charge of the twenty nine cells will again be bled down to 68%, for example, and then all of the cells will again be charged so as to raise each of the cells state of charge by 2%. After this second cycle, the twenty nine cells will again have a 70% state of charge and the one cell will have a 64% state of charge. Performing another 3 such cycles will bring all cells to a state of charge of 70%.

Each of the above cycles may be completed in a relatively short time period (e.g., 5 to 10 minutes or more depending on battery capacity). From a timing perspective, this may be satisfactory in circumstances where it is not known how long the vehicle will be on-plug. Vehicle drive range is adversely affected as cells are bled down. If a driver unplugs the vehicle after cell bleed down and before cell recharge, the relatively small decrement in cell state of charge minimizes reductions in vehicle drive range.

While incremental battery rebalancing may be satisfactory from a timing perspective, it may not be satisfactory from an efficiency perspective. Incremental charging of battery cells is typically performed at relatively low charge rates to avoid cell over-charging. Hence, it may be more efficient to rebalance a battery in a single cycle as opposed to several. Single cycle charging of battery cells may be performed at relatively high charge rates for a significant portion of the charge duration. If, for example, battery cells are to be charged from 60% state of charge to 95% state of charge, a relatively high charge rate may be used to charge the cells from 60% to 83%. A relatively low charge rate may then be used to charge the cells from 83% to 95%.

Certain embodiments disclosed herein may provide an alert indicating that battery rebalancing is recommended. If the driver provides appropriate input in response to the alert, the battery may be rebalanced in one cycle as opposed to several. If the driver does not provide the appropriate input in response to the alert, the battery may be rebalanced in several incremental cycles as opposed to one. This strategy effectively allows the driver to inform appropriate vehicle control systems of the time available for rebalancing. If plenty of time is available for rebalancing because, for example, the vehicle is being placed on-plug over night, the driver may respond to the alert and the battery may be rebalanced in one cycle. Otherwise, the battery may be rebalanced in several incremental cycles.

Several techniques may be used (alone or in combination) to determine whether the battery needs to be rebalanced (because a battery imbalance condition exists). As an example, the voltage across each of the cells may be determined in any suitable/known fashion (e.g., measured via circuitry) and compared. If one of the cell voltages differs from the others by more than a predetermined amount (e.g., 2% to 10%), a battery imbalance condition exists. As another example, the vehicle run time (the total time the vehicle has been in the on-state since it was last on-plug) may be determined in any suitable/known fashion (e.g., a timer that counts while the vehicle is in the on-state and is reset when the vehicle is put on-plug) and compared to a predetermined threshold. If the vehicle run time exceeds the threshold, a battery imbalance condition exists. As yet another example, the self-discharge rate of each of the cells may be determined in any suitable/known fashion (e.g., each cell voltage may be measured over time to determine the rate of change) and compared to a predetermined threshold. If any one of the self-discharge rates is greater than the threshold, a battery imbalance condition exists. Other techniques may also be used.

Testing has revealed that for certain cell chemistries, such as lithium ion cell chemistries, the amp hour output (and voltage) of a cell is relatively constant until the cell's energy is nearly exhausted—at which point, the cell's amp hour output drops off rapidly. (Because battery cells may be connected in series, a rapid decrease in amp hour output of a single cell will limit the amp hour output of the entire pack.) Hence, a cell's amp hour output (or voltage) may not be a good indicator of how close the cell is to exhaustion. Testing, simulation, etc., however, may be used to determine, for a given cell, the duration of this relatively constant amp hour output for a given amount of energy stored by the cell. That is, testing, simulation, etc. may be used to determine how long a cell will exhibit this relatively constant amp hour output before reaching its drop off point. This information may then be used to establish a vehicle run time threshold at which the battery should be rebalanced to avoid circumstances where a cell reaches its drop off point. If, for example, it takes 10 hours for a particular cell of a given energy content to reach its drop off point, the vehicle run time threshold may be set at 8 hours, etc. Vehicle run time may thus be used to estimate how close any one cell of the battery is to its drop-off point.

Differing cell self-discharge rates may be indicative of differing cell energy contents. A cell having a self-discharge rate that is greater than the others by a predetermined amount (e.g., 10%, etc.) may thus indicate an energy content imbalance between it and the other cells.

Referring to FIG. 1, an embodiment of a PHEV 10 may include an engine 12, a plurality of battery cells 13 forming a battery 14 and an electric machine 16. The PHEV 10 may also include a transmission 18, wheels 20, one or more controllers 22, electrical port 24, and display/interface 26 (e.g., screen, speakers, button, etc.)

The engine 12, electric machine 16 and wheels 20 are mechanically connected with the transmission 18 (as indicated by thick lines) in any suitable/known fashion such that the engine 12 and/or electric machine 16 may drive the wheels 20, the engine 12 and/or wheels 20 may drive the electric machine 16, and the electric machine 16 may drive the engine 12. Other arrangements are also possible.

The battery 14 may provide energy to or receive energy from the electric machine 16. The battery 14 may also receive energy from a utility grid or other off-board energy source (not shown) via the electrical port 24 as known in the art.

The one or more controllers 22 are in communication with and/or control the engine 12, battery 14, electric machine 16, transmission 18 and display/interface 26 (as indicated by thin line). The one or more controllers 22 may determine whether a battery imbalance condition exists (and hence whether battery rebalancing is recommended) using any of the techniques described above (or any other suitable/known technique). The one or more controllers 22, for example, may implement a counter that keeps track of the total time the vehicle 10 is in the on-state (the vehicle run time). This counter may be reset each time the vehicle 10 is plugged in via the electrical port 24. The one or more controllers 22 may periodically compare the vehicle run time with, for example, a predetermined 9 hour vehicle run time threshold. Once the vehicle run time exceeds the 9 hour threshold, the one or more controllers 22 may cause an alert (audio, visual, tactile, etc.) to be output via the display/interface 26 (e.g., the one or more controllers 22 may cause the display/interface 26 to light up). If the driver responds to the alert (e.g., presses the display/interface 26), the one or more controllers 22 may cause the battery 14 to be rebalanced in a single cycle the next time the vehicle 10 is plugged in via the electrical port 24. If the driver does not respond to the alert, the one or more controllers may cause the battery 14 to be rebalanced incrementally over several cycles the next time the vehicle 10 is plugged in via the electrical port 24.

Alternatively, the one or more controllers 22 may periodically (e.g., every 5 minutes) cause the voltage of each of the cells 13 to be measured while the vehicle 10 is in an off-state. The one or more controllers 22 may then determine the self-discharge rate for each of the cells 13 based on the measured values. As an example, if the voltage of one of the battery cells 13 is 5V at time 0 min., 4V at time 5 min. and 3V at time 10 min., then the self-discharge rate for this cell (in this exaggerated example) is 12V/hour.

The one or more controllers 22 may periodically compare the self-discharge rate for each of the cells 13 to a predetermined self-discharge rate threshold (e.g., 5 mV/day). This self-discharge rate threshold, in certain embodiments, may be temperature dependent as self-discharge rates may increase as temperatures decrease. Once the self-discharge rate for any one (or more) of the cells 13 exceeds the self-discharge rate threshold, the one or more controllers 22 may cause an alert to be output via the display/interface 26. If the driver responds to the alert, the one or more controllers 22 may cause the battery 14 to be rebalanced in a single cycle the next time the vehicle 10 is plugged in via the electrical port 24. Otherwise the one or more controllers may cause the battery 14 to be rebalanced incrementally over several cycles the next time the vehicle 10 is plugged in via the electrical port 24. Other scenarios are also possible.

After the vehicle 10 is plugged in, the one or more controllers 22 may determine in any suitable/known fashion the state of charge of each of the cells 13 (e.g., based on the cell voltages at known currents, a known load and at a given temperature). Assuming the driver has responded to the alert as discussed above, the one or more controllers 22 may then cause all of the cells 13, except the cell 13 having the lowest state of charge, to be bled down in any suitable/known fashion (e.g., via resistive circuitry) such that they have a state of charge approximately equal to the cell 13 having the lowest state of charge. The one or more controllers 22 may then cause electrical power received from an off-board energy source (not shown) via the electrical port 24 to charge all of the cells 13 to some desired target (e.g., 95%). Thus, the battery 14 has been rebalanced in a single cycle.

The one or more controllers 22, in some embodiments, may determine whether a battery imbalance condition is present based on two or more of the above described techniques (or any other suitable/known techniques). Any one of these techniques may be subject to error given the multitude of conditions in which the vehicle 10 may find itself. The one or more controllers 22 may thus have a higher probability of identifying a battery imbalance condition if, for example, it observes the self-discharge rate of the cells 13 as well as the vehicle run time, etc.

Figure 2:
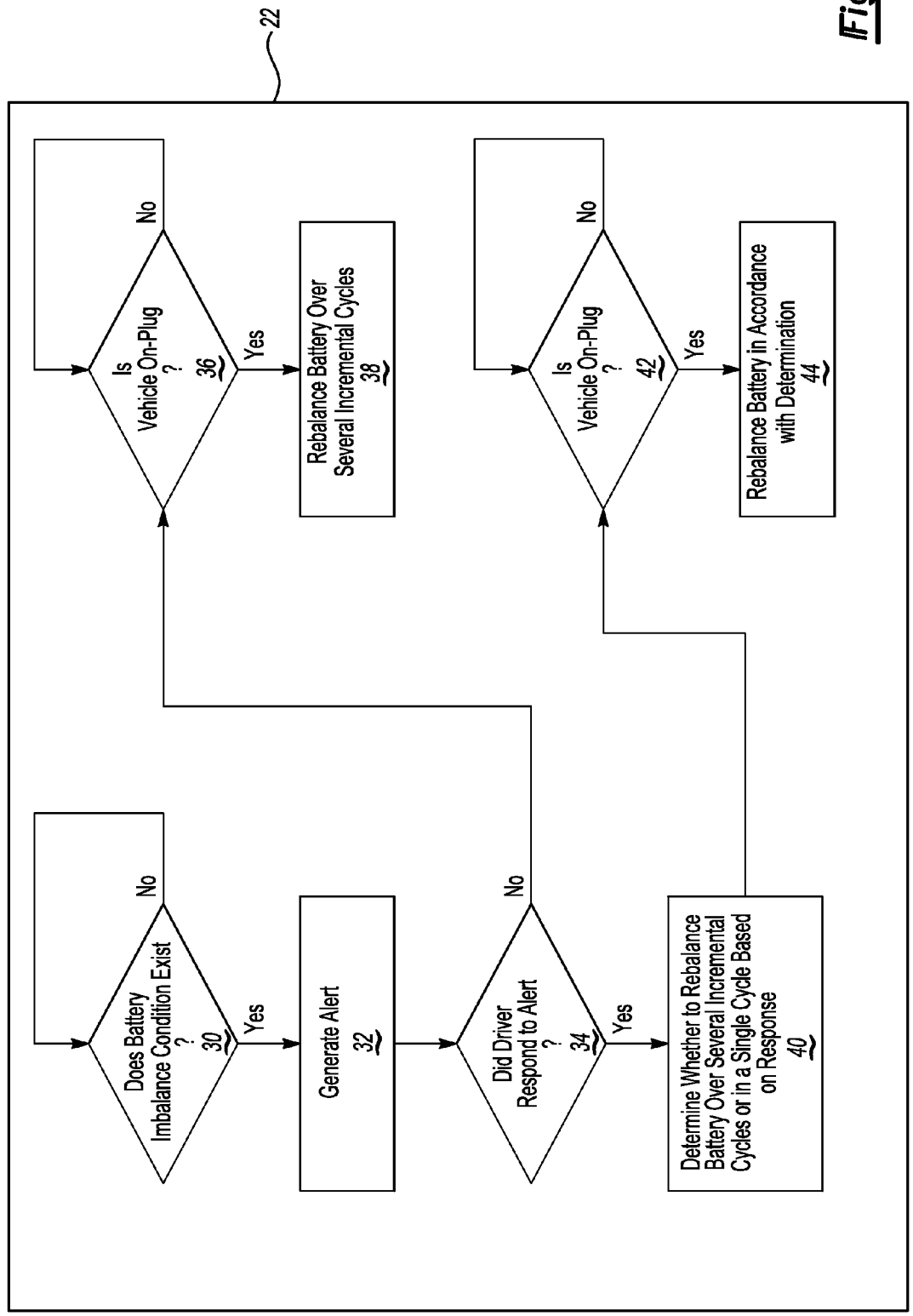
FIG. 2 is a flow chart depicting an example algorithm for determining the manner in which the battery of FIG. 1 is to be rebalanced.

Referring to FIG. 2, the one or more controllers 22 may determine whether a battery imbalance condition exists at operation 30. If no, the algorithm returns to operation 30. If yes, the algorithm proceeds to operation 32.

At operation 32, the one or more controllers 22 may generate an alert.

At operation 34, the one or more controllers 22 may determine whether the driver responded to the alert. If no, the algorithm proceeds to operation 36. At operation 36, the one or more controllers 22 may determine whether the vehicle 10 (FIG. 1) is on-plug. If no, the algorithm returns to operation 36. If yes, the one or more controllers 22 may rebalance the battery 14 (FIG. 1) over several incremental cycles.

Returning to operation 34, if yes, the algorithm proceeds to operation 40. At operation 40, the one or more controllers 22 may determine whether to rebalance the battery 14 (FIG. 1) over several incremental cycles or in a single cycle based on the response. In one embodiment, the one or more controllers 22 may determine to rebalance the battery 14 in a single cycle if the driver merely responds to the alert. In another embodiment, the one or more controllers 22 may determine to rebalance the battery 14 in a single cycle only if the response indicates that the vehicle 10 (FIG. 1) is to be on-plug for at least the amount of time it would take to rebalance the battery 14 in a single cycle. Other scenarios are also possible. The algorithm then proceeds to operation 42.

At operation 42, the one or more controllers 22 may determine whether the vehicle 10 (FIG. 1) is on-plug. If no, the algorithm returns to operation 42. If yes, the one or more controllers 22 may rebalance the battery 14 (FIG. 1) in accordance with the determination made at operation 40.

The algorithms disclosed herein may be deliverable to a processing device, such as the one or more controllers 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as application specific integrated circuits (ASICs), field-programmable gate arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. As an example, certain embodiments may be implemented within the context of a BEV or other vehicle having a battery configured to receive electrical power from an off-board power source. Still other embodiments may permit the driver to provide input indicating which of the rebalancing techniques to use (incremental versus single cycle). The driver, for example, may provide input via the display/interface 26 in response to a rebalance alert that incremental rebalancing should be performed (presumably because the vehicle 10 will be on-plug for only a relatively short period of time). Other scenarios are also possible.

The words used in the specification are words of description rather than limitation. It is understood that various changes may be made without departing from the spirit and scope of the invention.

What is claimed:

1. A vehicle comprising:
    an electric machine configured to generate motive power for the vehicle;
    a battery configured to store energy for the electric machine;
    a driver interface; and
    one or more controllers configured to
        determine whether a battery imbalance condition exists,
        cause an alert to be generated via the driver interface if a battery imbalance condition exists,
        determine whether a response to the alert is received, and
        cause the battery to be rebalanced in a single cycle if a response to the alert is received.

2. The vehicle of claim 1 wherein the one or more controllers are further configured to cause the battery to be rebalanced in a plurality of cycles if a response to the alert is not received.

3. The vehicle of claim 1 wherein the battery includes a plurality of cells, wherein the one or more controllers are further configured to monitor a voltage of each of the cells, and wherein the one or more controllers are configured to determine whether a battery imbalance condition exists based on the voltages.

4. The vehicle of claim 1 wherein the one or more controllers are further configured to monitor a vehicle run time and wherein the one or more controllers are configured to determine whether a battery imbalance condition exists based on the vehicle run time.

5. The vehicle of claim 1 wherein the battery includes a plurality of cells, wherein the one or more controllers are further configured to determine a self-discharge rate for each of the cells, and wherein the one or more controllers are configured to determine whether a battery imbalance condition exists based on the self-discharge rates.

6. The vehicle of claim 1 wherein the driver interface is a button, wherein causing an alert to be generated via the driver interface if a battery imbalance condition exists includes causing the button to be illuminated, and wherein determining whether a response to the alert is received includes determining whether the button has been pressed.

7. A method for rebalancing a vehicle battery including a plurality of cells comprising:
    determining whether an imbalance condition of the battery exists;
    generating an alert if an imbalance condition of the battery exists;
    determining whether the battery is to be rebalanced in a single cycle or in a plurality of cycles based on a response from a driver to the alert; and
    rebalancing the battery in accordance with the determination.

8. The method of claim 7 further comprising monitoring a voltage of each of the cells and wherein determining whether an imbalance condition of the battery exists includes determining a maximum difference between the voltages.

9. The method of claim 8 wherein determining whether an imbalance condition of the battery exists further includes comparing the maximum difference to a predetermined difference.

10. The method of claim 7 further comprising monitoring a vehicle run time and wherein determining whether an imbalance condition of the battery exists includes comparing the vehicle run time to a predetermined vehicle run time.

11. The method of claim 7 further comprising monitoring, over time, a voltage of each of the cells to determine a self-discharge rate for each of the cells and wherein determining whether an imbalance condition of the battery exists includes comparing each of the self-discharge rates to a predetermined self-discharge rate.

12. The method of claim 11 wherein the predetermined self-discharge rate is temperature dependent.

13. A vehicle comprising:
    an electric machine configured to generate motive power for the vehicle;
    a battery configured to store energy for the electric machine; and
    one or more controllers configured to determine whether to rebalance the battery in a single cycle or in a plurality of cycles and to cause the battery to be rebalanced in accordance with the determination.

14. The vehicle of claim 13 wherein the one or more controllers are further configured to determine whether a battery imbalance condition exists.

15. The vehicle of claim 14 wherein the battery includes a plurality of cells, wherein the one or more controllers are further configured to monitor a voltage of each of the cells, and wherein the one or more controllers are configured to determine whether a battery imbalance condition exists based on the voltages.

16. The vehicle of claim 14 wherein the one or more controllers are further configured to monitor a vehicle run time and wherein the one or more controllers are configured to determine whether a battery imbalance condition exists based on the vehicle run time.

17. The vehicle of claim 14 wherein the battery includes a plurality of cells, wherein the one or more controllers are further configured to determine a self-discharge rate for each of the cells, and wherein the one or more controllers are configured to determine whether a battery imbalance condition exists based on the self-discharge rates.

18. The vehicle of claim 14 further comprising a display and wherein the one or more controllers are further configured to cause an alert to be generated via the display if a battery imbalance condition exists.

* * * * *